(12) United States Patent
Koseki et al.

(10) Patent No.: US 8,104,026 B2
(45) Date of Patent: Jan. 24, 2012

(54) COMPILER REGISTER ALLOCATION AND COMPILATION

(75) Inventors: Akira Koseki, Sagamihara (JP); Hideaki Komatsu, Yokohama (JP)

(73) Assignee: International Business Machines Corporation, Armonk, NY (US)

( * ) Notice: Subject to any disclaimer, the term of this patent is extended or adjusted under 35 U.S.C. 154(b) by 1121 days.

(21) Appl. No.: 11/927,355

(22) Filed: Oct. 29, 2007

(65) Prior Publication Data

US 2008/0134151 A1 Jun. 5, 2008

Related U.S. Application Data

(63) Continuation of application No. 10/458,823, filed on Jun. 11, 2003, now Pat. No. 7,305,665.

(30) Foreign Application Priority Data

Jun. 12, 2002 (JP) .................................. 2002-171856

(51) Int. Cl.
G06F 9/44 (2006.01)
(52) U.S. Cl. .......................... 717/140; 717/138; 717/151
(58) Field of Classification Search .......... 717/138–143, 717/151
See application file for complete search history.

(56) References Cited

U.S. PATENT DOCUMENTS

| 4,571,678 | A | 2/1986 | Chaitin |
| 5,367,696 | A | 11/1994 | Abe |
| 5,428,793 | A | 6/1995 | Odnert et al. |
| 5,555,417 | A | 9/1996 | Odnert et al. |
| 5,684,994 | A | 11/1997 | Tanaka et al. |
| 5,946,491 | A | 8/1999 | Aizikowitz et al. |
| 6,128,775 | A | 10/2000 | Chow et al. |
| 6,408,433 | B1 | 6/2002 | Click et al. |
| 6,421,824 | B1 | 7/2002 | Click et al. |
| 6,609,249 | B2 | 8/2003 | Kunz |
| 6,651,247 | B1 | 11/2003 | Srinivasan |
| 2002/0056077 | A1 | 5/2002 | Kunz |

FOREIGN PATENT DOCUMENTS

| JP | 05204660 | 8/1993 |
| JP | 007121377 | 5/1995 |
| JP | 2001101008 | 4/2001 |

OTHER PUBLICATIONS

Tomohiro Haraikawa et al. "Register Allocation Frameworks for Slide-Window Architecture", Sep. 1998.

*Primary Examiner* — Anna Deng
(74) *Attorney, Agent, or Firm* — Scully, Scott, Murphy & Presser, P.C.; William Stock, Esq.

(57) ABSTRACT

Assigns suitable registers to a plurality of variables. A compiler converts a source program into instructions for a processor having: a simultaneously used variable acquisition section which obtains, with respect to each of a plurality of variables used in the source program, some of the other variables used simultaneously with the variable; an allocation sequence generation section which generates a plurality of allocation sequences between the plurality of variables to allocate each variable to one of the plurality of registers different from those to which some of the other variables used simultaneously with the variable are allocated; an allocation priority acquisition section which obtains allocation priorities indicating to which one of the plurality of registers each variable is allocated with priority; and a register allocation section which allocates the variables to registers in accordance with an allocation sequence selected on the basis of the allocation priorities.

32 Claims, 10 Drawing Sheets

FIG. 7A
```
         v0=[arg0]  ◄── 910
L1:      v1=[v0]    ◄── 920
         v2=[v0+4]  ◄── 930
         v3=v0      ◄── 940
         v4=v1+v2   ◄── 950
         arg0=v3    ◄── 960
         call       ◄── 970
         v0=v4+1    ◄── 980
         if v0!=0 goto L1 ◄── 990
         ret        ◄── 995
```
FIG. 7B
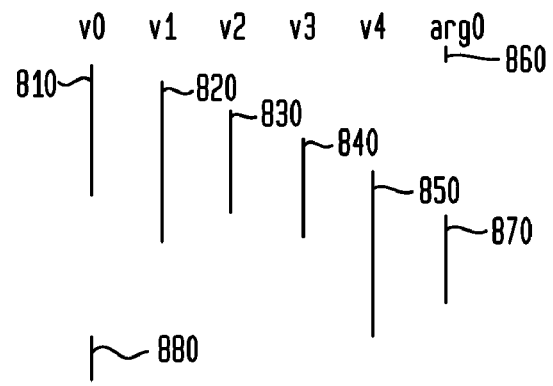
FIG. 7C
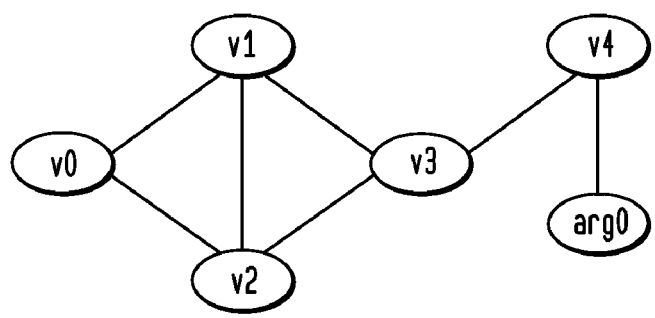

STACK A | v0, v4, v1, v2, v3

compiler

COMPILER REGISTER ALLOCATION AND COMPILATION

This application is a continuation of U.S. application Ser. No. 10/458,823 filed on Jun. 11, 2003.

FIELD OF THE INVENTION

The present invention is directed to compilation and register allocation. More particularly, the present invention is directed to compilation and register allocation considering preference between variables and registers.

BACKGROUND OF THE INVENTION

According to U.S. Pat. No. 4,571,678, a register allocation method has been proposed in which inter-variable allocation sequences are generated to allocate each of a plurality of variables to a register different from registers to which some other of the variables simultaneously used are allocated. The variables are successively allocated to the registers in accordance with the allocation sequences. This method minimizes the number of times the value of each variable is saved to a memory, or retrieved from a memory, to limit the amount of access to the memory.

The above-described method, however, does not prevent a reduction in the speed of execution of generated instructions in a computer having a plurality of registers differing in characteristics from each other, because a mismatch may occur between the way of using a variable and the register allocated for the variable.

SUMMARY OF THE INVENTION

Therefore, the present invention provides a compiler, a register allocation apparatus, a program, a recording medium, a compilation method, and a register allocation method which enable solution of the above-described problem.

According to one aspect of the present invention, there are provided: a register allocation apparatus which is a compiler for converting a source program into instructions for a processor, and which has a simultaneously used variable acquisition section which obtains, with respect to each of a plurality of variables used in the source program, some of the other variables used simultaneously with the variable; an allocation sequence generation section which generates a plurality of allocation sequences between the plurality of variables to allocate each variable to one of the plurality of registers different from those to which some of the other variables used simultaneously with the variable are allocated; an allocation priority acquisition section which obtains allocation priorities indicating to which one of the plurality of registers each variable is allocated with priority; and a register allocation section which allocates the plurality of variables to the registers in accordance with one of the allocation sequences selected on the basis of the allocation priorities, a register allocation method, a program for realizing the register allocation apparatus, a recording medium on which the program is recorded, a compiler having the register allocation apparatus, a method of compilation by the compiler, a program for realizing the compiler, and a recording medium on which the program is recorded.

According to another aspect of the present invention, there are provided a register allocation apparatus which is a compiler for converting a source program into instructions for a processor, and which has an allocation priority generation section which generates, as allocation priorities for allocation of each of a plurality of variables used in the source program to one of a plurality of registers, at least one of register preference information indicating to which kind of register the variable should be allocated and variable relation information which is information indicating the relationship between the variable and the other variables on the source program, on the basis of the way in which the variable is used in the source program, and a register allocation section which allocates the plurality of variables to the plurality of registers on the basis of the allocation priorities, a register allocation method, a program for realizing the register allocation apparatus, a recording medium on which the program is recorded, a compiler having the register allocation apparatus, a method of compilation by the compiler, a program for realizing the compiler, and a recording medium on which the program is recorded.

BRIEF DESCRIPTION OF THE DRAWINGS

These and other aspects, features, and advantages of the present invention will become apparent upon further consideration of the following detailed description of the invention when read in conjunction with the drawing figures, in which:

FIG. 7(a) is a diagram showing an example of a source program compiled by compiler 10;

FIG. 7(b) shows live ranges of the variable;

FIG. 7(c) shows an example of an interference graph;

DESCRIPTION OF SYMBOLS

Figure 1:
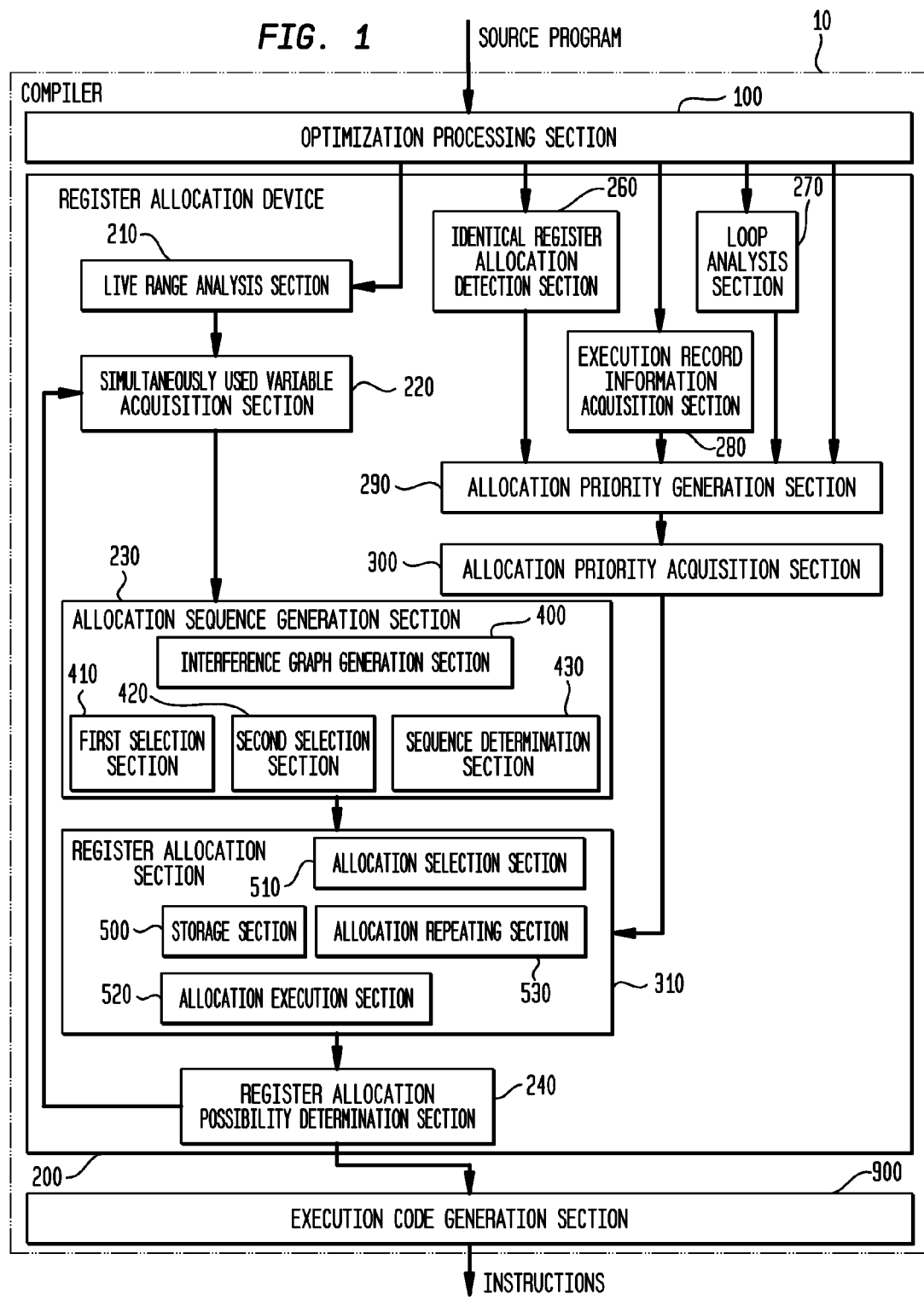
FIG. 1 is a diagram showing an example of functional blocks of compiler 10.

10 . . . compiler
100 . . . optimization processing section
200 . . . register allocation device
900 . . . execution code generation section
210 . . . live range analysis section
220 . . . simultaneously used variable acquisition section
230 . . . allocation sequence generation section
240 . . . register allocation possibility determination section
260 . . . identical register allocation detection section
270 . . . loop analysis section
280 . . . execution record information acquisition section
290 . . . allocation priority generation section
300 . . . allocation priority acquisition section
310 . . . register allocation section
400 . . . interference graph generation section
410 . . . first selection section
420 . . . second selection section
430 . . . sequence determination section 500 . . . storage section
510 . . . allocation selection section
520 . . . allocation execution section
530 . . . allocation repeating section
610 . . . first instruction
620 . . . second instruction
630 . . . third instruction
640 . . . fourth instruction
650 . . . fifth instruction
660 . . . sixth instruction
670 . . . seventh instruction
810 . . . first live range
820 . . . second live range
830 . . . third live range
840 . . . fourth live range
850 . . . fifth live range
860 . . . sixth live range
870 . . . seventh live range
880 . . . eighth live range
910 . . . first statement
920 . . . second statement
930 . . . third statement
940 . . . fourth statement
950 . . . fifth statement
960 . . . sixth statement
970 . . . seventh statement
980 . . . eighth statement
990 . . . ninth statement
995 . . . tenth statement

DESCRIPTION OF THE INVENTION

The present invention provides apparatus and systems having a compiler, a register allocation apparatus, a program, a recording medium, compilation methods, and register allocation methods which enable solution of the above-described problem. This can generally be achieved by a combination of features described in the independent claims in the appended claims. In the dependent claims, further advantageous examples of the present invention are specified.

In a particular embodiment of the present invention, there is provided a register allocation apparatus which is a compiler for converting a source program into instructions for a processor. It has a simultaneously used variable acquisition section which obtains, with respect to each of a plurality of variables used in the source program, some of the other variables used simultaneously with the variable. It also has an allocation sequence generation section which generates a plurality of allocation sequences between the plurality of variables to allocate each variable to one of the plurality of registers different from those to which some of the other variables used simultaneously with the variable are allocated. It also includes an allocation priority acquisition section which obtains allocation priorities indicating to which one of the plurality of registers each variable is allocated with priority, and a register allocation section which allocates the plurality of variables to the registers in accordance with one of the allocation sequences selected on the basis of the allocation priorities. It has a register allocation method, a program for realizing the register allocation apparatus, a recording medium on which the program is recorded, a compiler having the register allocation apparatus, a method of compilation by the compiler, a program for realizing the compiler, and a recording medium on which the program is recorded.

According to another embodiment of the present invention, there are provided a register allocation apparatus which is a compiler for converting a source program into instructions for a processor, and which has an allocation priority generation section which generates, as allocation priorities for allocation of each of a plurality of variables used in the source program to one of a plurality of registers, at least one of register preference information indicating to which kind of register the variable should be allocated and variable relation information which is information indicating the relationship between the variable and the other variables on the source program, on the basis of the way in which the variable is used in the source program, and a register allocation section which allocates the plurality of variables to the plurality of registers on the basis of the allocation priorities, a register allocation method, a program for realizing the register allocation apparatus, a recording medium on which the program is recorded, a compiler having the register allocation apparatus, a method of compilation by the compiler, a program for realizing the compiler, and a recording medium on which the program is recorded. The above-described embodiments of the invention are not a combination of all the necessary features of the present invention, and subcombinations of these features can also represent the present invention.

A further embodiment of the present invention will be described below. The embodiment described below is not to be construed to limit the present invention set forth in the appended claims. FIG. 1 is a diagram showing an example of a functional block configuration of a compiler 10. The compiler 10 is provided for the purpose of performing register allocation by using preference between variables and registers while minimizing the amount of access to a memory. The compiler 10 has an optimization processing section 100, a register allocation device 200, and an execution code generation section 900.

The optimization processing section 100 receives a source program from the outside, converts the source program by performing some of various kinds of optimization, e.g., data flow optimization and inlining of a function or a method, and sends the converted source program to the register allocation device 200. The register allocation device 200 receives the source program from the optimization processing section 100, allocate variables used in the source program to registers in instructions executable by a processor, and sends the instructions to the execution code generation section 900. The execution code generation section 900 receives the instructions from the register allocation device 200, converts the instructions into a format executable by the processor, and outputs the converted instructions to the outside. The source program is, for example, a program written in a surface language such as Java° (a trademark of Sun Microsystems, Inc.) or the C language. Alternatively, the source program may be Java° bytecode of a surface language or an intermediate expression such as RTL (an acronym of Register Transfer Language) (e.g., Intermediate Representation). The source program may be the entire program written in such a representation or a module or an object formed as a portion of such a program to perform only particular kind of processing.

The register allocation device 200 has a live range analysis section 210, a simultaneously used variable acquisition section 220, an allocation sequence generation section 230, a register allocation possibility determination section 240, an identical register allocation detection section 260, a loop analysis section 270, an execution record information acquisition section 280, an allocation priority generation section 290, an allocation priority acquisition section 300, and a register allocation section 310.

The live range analysis section 210 receives the source program from the optimization processing section 100 and analyzes the source program to detect a plurality of variables, which are, for example, variables themselves in the source program. Each of the variables may be a live range representing a range from an event in which a value is substituted in a variable to an event in which the value is finally used in the source program. In such a case, the live range analysis section 210 may analyzes the live range of each value used in the source program by data flow analysis or a like technique. The live range analysis section 210 sends the source program and information on the plurality of variables to the simultaneously used variable acquisition section 220.

The simultaneously used variable acquisition section 220 receives the source program and the information on the plurality of variables from the live range analysis section 210 or the register allocation possibility determination section 240, and analyzes the source program to obtain, with respect to each variable, some of the other interfering variables, which are used simultaneously with the variable referred to. For example, the simultaneously used variable acquisition section 220 analyzes the plurality of variables with respect to one of the values of the plurality of variables and recognizes, as an interfering variable, some of the other values whose live range overlaps at least partially that of the variable referred to. The simultaneously used variable acquisition section 220 sends information on the interfering variables and the source program to the allocation sequence generation section 230.

The allocation sequence generation section 230 has an interference graph generation section 400, a first selection section 410, a second selection section 420, and a sequence determination section 430. The interference graph generation section 400 receives the information on the variables in the interfering state from the simultaneously used variable acquisition section 220, and forms an interference graph in which these variables are expressed as nodes and in which the interference between variables is expressed by an edge. The first selection section 410 and the second selection section 420 simplify the interference graph by a graph coloring method. The sequence determination section 430 generates variable allocation sequences for allocation of the variables to the registers as a partial order on the basis of information obtained by simplification of the interference graph, and sends the generated allocation sequences to the register allocation section 310. The allocation sequence generation section 230 sends to the register allocation section 310 the source program received from the simultaneously used variable acquisition section 220.

"Partial order" denotes a sequence in which sequential order is determined between at least one pair of variables, and in which no cycles appear between the variables on the whole. While in this embodiment the allocation sequence generation section 230 generates a partial order as register allocation sequences, a plurality of allocation sequences generated by the allocation sequence generation section 230 is not limited to this example. For example, the allocation sequence generation section 230 may generate a plurality of whole sequence relationships as allocation sequences or may express a plurality of allocation sequences by using a partial order including a plurality of whole sequences.

The identical register allocation detection section 260 receives the source program from the optimization processing section 100 and analyzes the source program to detect a combination of some of the plurality of variables such that if the variables in the combination are allocated to the same register, the speed of execution of the instructions, and sends information on this combination of variables to the allocation priority generation section 290. The loop analysis section 270 receives the source program from the optimization processing section 100 and analyzes the source program to detect a loop portion repeatedly executed, and sends information on this loop portion to the allocation priority generation section 290. The execution record information acquisition section 280 obtains from the optimization processing section 100 execution record information about execution of the source program carried out in advance, and sends the execution record information to the allocation priority generation section 290. The allocation priority generation section 290 receives the variable combination information, the loop portion information, the execution record information, and the source program from the identical register allocation detection section 260, the loop analysis section 270, and the execution record information acquisition section 280, and the optimization processing section 100, respectively, and generates, on the basis of these kinds of information and the program, allocation priorities indicating to which one of the plurality of registers each variable is allocated with priority. The allocation priority generation section 290 sends the allocation priorities to the allocation priority acquisition section 300. The allocation priority acquisition section 300 obtains the allocation priorities from the allocation priority generation section 290 and sends the allocation priorities to the register allocation section 310.

The register allocation section 310 has a storage section 500, an allocation selection section 510, an allocation execution section 520, and an allocation repeating section 530. The storage section 500 receives the allocation sequences from the allocation sequence generation section 230 and stores at least one simultaneously allocation candidate variable having the top position in the allocation sequences. The allocation selection section 510 receives the allocation priorities from the allocation priority acquisition section 300. The allocation selection section 510, the allocation execution section 520 and the allocation repeating section 530 allocate the variables one after another according to the allocation order by using the storage section 500 as required on the basis of the allocation sequences and the allocation priorities. The register allocation section 310 then sends to the register allocation possibility determination section 240 the results of allocation to the registers together with the source program received from the allocation sequence generation section 230.

The register allocation possibility determination section 240 receives the results of allocation to the registers from the register allocation section 310. If the register allocation possibility determination section 240 determines that each variable can not be allocated to the register, it makes a predetermined change in the plurality of variables and sends to the simultaneously used variable acquisition section 220 the source program received from the allocation sequence generation section 230 together with information on the plurality of variables having the change made therein. Thus, the compiler 10 can allocate a plurality of variables to registers on the basis of the ways in the values are used in the variables in the source program while minimizing the amount of saving of register values to a memory and the amount of retrieval of register values from the memory.

Figure 2:
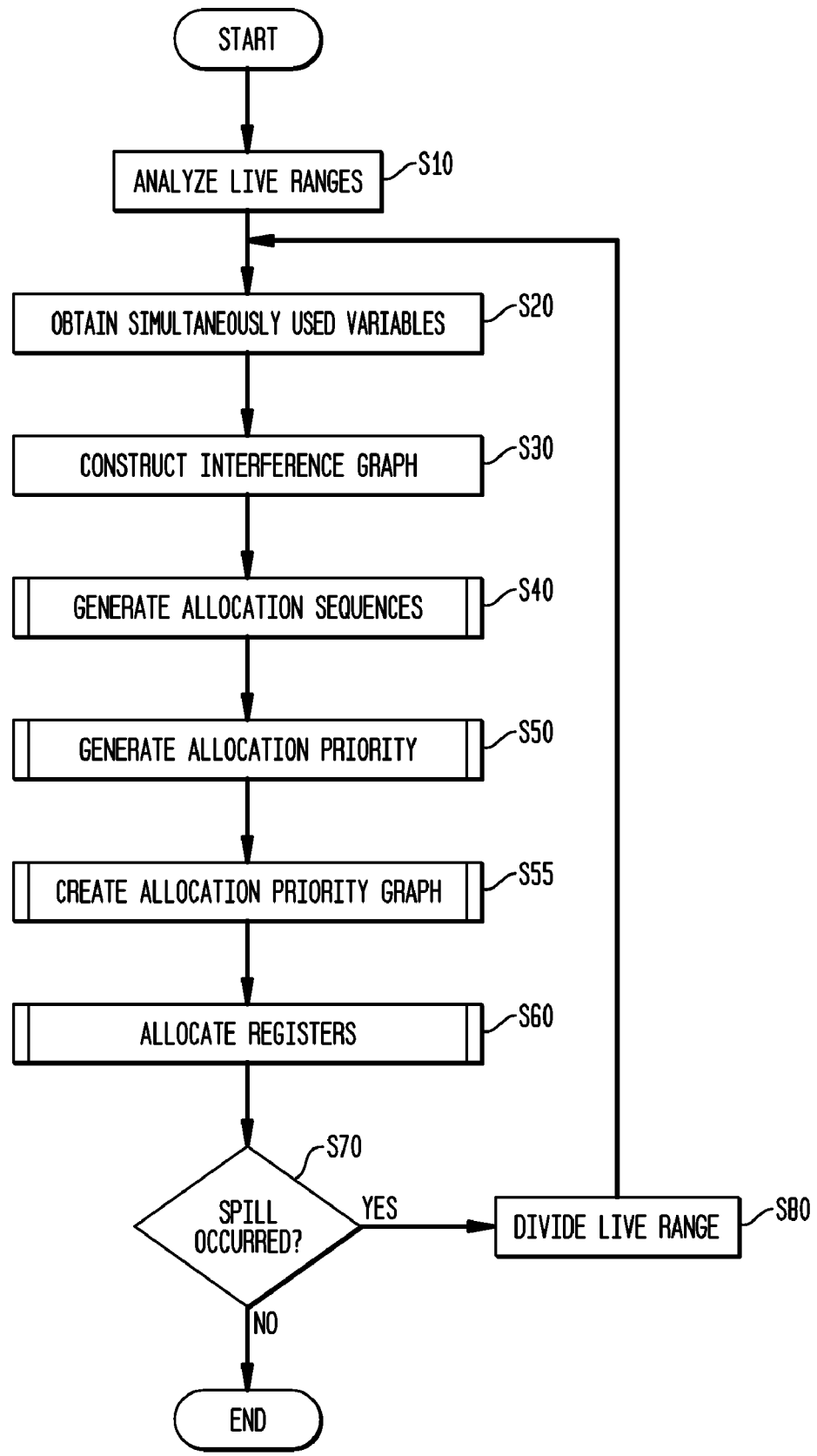
FIG. 2 is a flowchart of an operation of compiler 10.

FIG. 2 is a flowchart of the operation of the compiler 10. The live range analysis section 210 analyzes the live ranges of the values of a plurality of variables (S10). The simultaneously used variable acquisition section 220 obtains information on the variables in a state of interfering with each variable used in a source program (S20). Subsequently, the interference graph generation section 400 generates an interference graph on this basis of this information. The allocation sequence generation section 230 generates allocation sequences between the plurality of variables as a partial order such that each variable is allocated to the same register different from those to which some of the other interfering variables with the variable are allocated (S40).

To allocate each variable to one of the registers different from those to which some of the other variables with the variable are allocated, the allocation sequence generation section 230 generates, for example, such allocation sequences between the plurality of variables that colorability by a graph coloring method is ensured. On the other hand, the allocation priority generation section 290 generates allocation priorities indicating to which one of the plurality of registers each variable is allocated with priority (S50).

The register allocation section 310 allocates the plurality of variables to the plurality of registers on the basis of the allocation sequences and the allocation priorities (S60). Subsequently, if the register allocation possibility determination section 240 determines that the register allocation section 310 has not allocated each variable to one of the registers different from those to which the variables in the state of interfering with the variable are allocated (S70: NO), it generates new variables from the plurality of variables by dividing at least one of the variables into two or more variables (S80). The process then returns to processing in step S20. The register allocation possibility determination section 240 ends register allocation if it determines that the register allocation section 310 has allocated each variable to one of the registers different from those to which the interfering variables with the variable are allocated (S70: YES).

As a way of making a determination as to whether each variable is allocated to the same register different from those to which the interfering variables with the variable are allocated, a method is used in which the register allocation possibility determination section 240 makes a determination on the basis of the result of processing in S60 as to whether a spill indicating saving of the register value to the memory has occurred. Alternatively, the register allocation possibility determination section 240 may make a determination as to register allocation possibility by making a determination as to whether the interference graph can be simplified.

Figure 3:
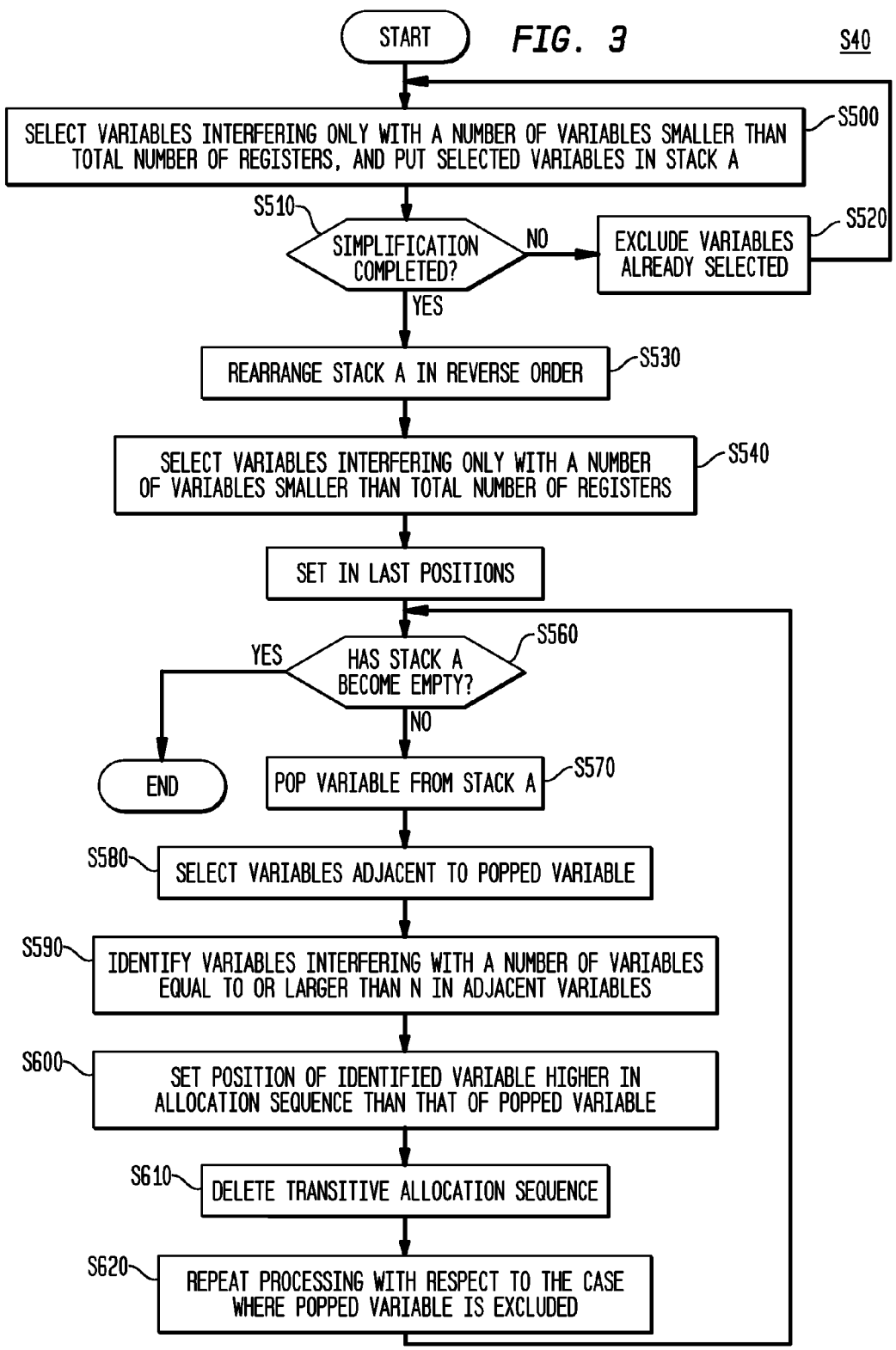
FIG. 3 is a flowchart showing an operation in S40.

FIG. 3 is a flowchart showing an example of the operation in S40. The allocation sequence generation section 230 prepares a stack A, i.e., a stacked data structure, as a storage area temporarily used when the operation in S40 is performed. The first selection section 410 selects all the interfering variables only with the number of the variables smaller than the total number of the registers (referred to as N in the following description) and pushes identifications of these variables one after another in arbitrary order (S500). The allocation sequence generation section 230 makes a determination as to whether simplification processing which corresponds to pushing all the variables in the source program into the stack A has been completed. If the allocation sequence generation section 230 determines that simplification processing has not been completed (S510: NO), the second selection section 420 excludes the variables already selected (S520) and performs processing in S500 with respect to the remaining variables in this case.

If the allocation sequence generation section 230 determines that simplification processing has been completed (S510: YES), the sequence determination section 430 rearranges the identification information in the stack A in the reverse order (S530). Subsequently, the sequence determination section 430 selects all the interfering variables only with the number of the variables smaller than N (S540) and sets these variables in the last positions in the allocation sequences (S550). Subsequently, the allocation sequence generation section 230 repeats processing which follows.

If the sequence determination section 430 determines that the stack A has become empty (S560: YES), it outputs the generated allocation sequences and the process ends. If the sequence determination section 430 determines that the stack A is not empty (S560; NO), it pops one identification from the stack A (S570) and selects at least one interfering variable with the variable corresponding to this identification information (S580).

The sequence determination section 430 then identifies, in the at least one variable selected, the interfering variable with the number of the variables equal to or larger than N (S590), and sets this identified variable prior to the variable popped from the stack A in the partial order (S600). That is, the sequence determination section 430 sets the variable that can interfere only with the number of the variables equal to or smaller than N−1 prior to the variable popped from the stack A by excluding the variable popped from the stack A.

Subsequently, the sequence determination section 430 deletes a transitive sequence formed by the generation of the allocation sequence. That is, in a case where the sequence determination section 430 detects, for example, a first variable as one of the plurality of variables in the source program, a second variable subsequent to the first variable in the partial order, a third variable subsequent to the second variable in the partial order, and an allocation sequence indicating that the third variable follows the first variable, it deletes the allocation sequence indicating that the third variable follows the first variable (S610). Subsequently, the sequence determination section 430 repeats execution of the processing from step S560 with respect to the case where a popped one of the variables is excluded (S610). Thus, the sequence determination section 430 can identify, by accessing the stack A in the reverse order, the order in which the second selection sections 420 has selected the variables. Accordingly, when the processing by the second selection section 420 is performed on each variable, the sequence determination section 430 can generate a partial order by setting the variable subsequent to another of the variables which becomes selectable when the variable is excluded.

Figure 4:
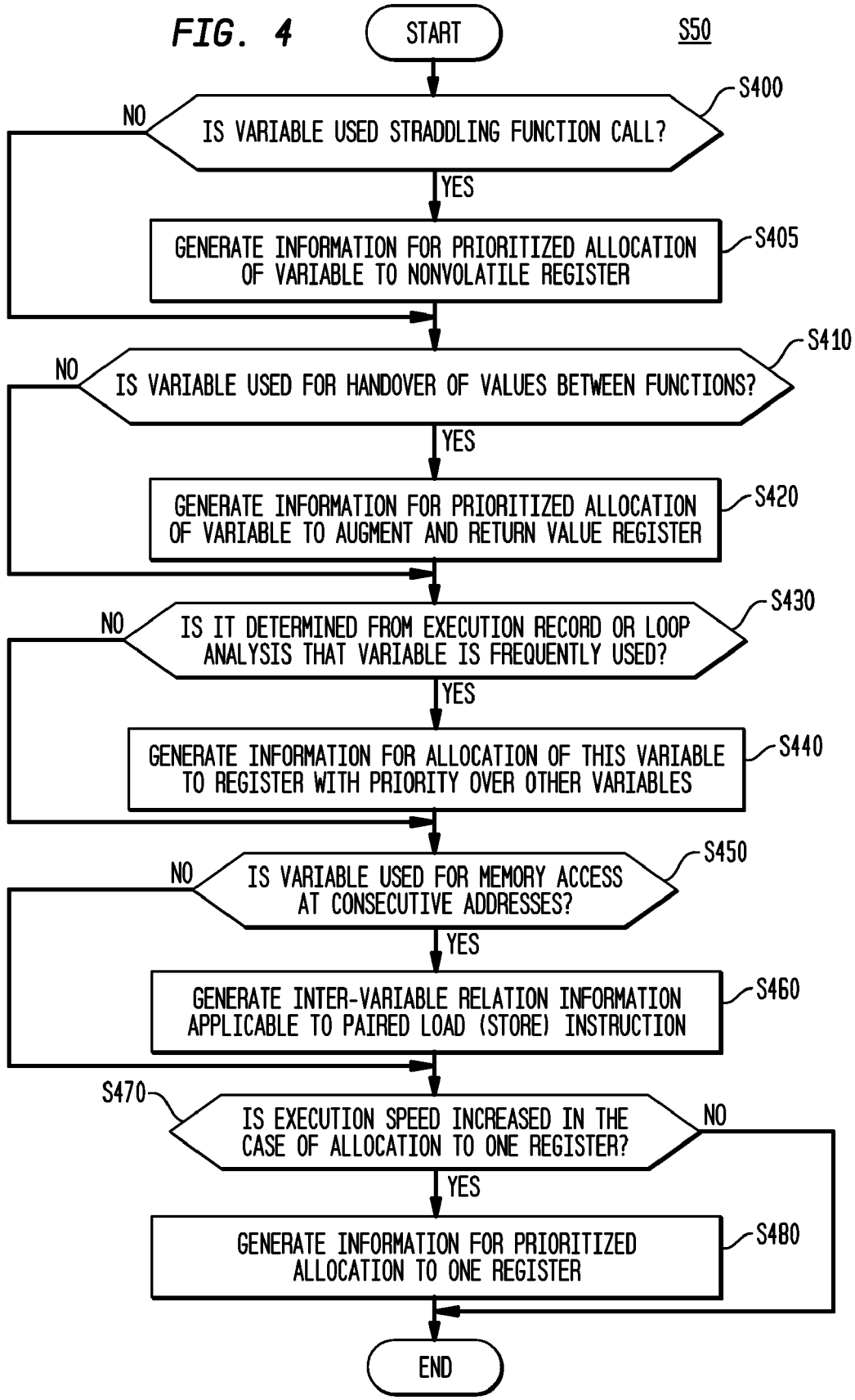
FIG. 4 is a flowchart showing an operation in S50.

FIG. 4 is a flowchart showing an example of an example of the operation in S50. If the allocation priority generation section 290 determines that one of the variables is used in a portion of the source program before a call for a function and in a portion after a return from the function call (S400: YES), it generates register preference information indicating that this variable is allocated, with priority, to one of the registers not used in the function (s405). The register not used in the function is, for example, a non-volatile register (called a non-volatile register or a callee-saved register, for example) which is determined by a function call procedure (called Calling Convention) with respect to instructions, i.e., execution code, and with which saving and restoring of values for a called function are prescribed.

Subsequently, if the allocation priority generation section 290 determines that the variable is used for handover of values between functions (S410: YES), it generates register preference information indicating that the variable is allocated, with priority, to an argument register or a return value register prescribed in a function call procedure (S420).

The execution record information acquisition section 280 obtains from the optimization processing section 100 execution record information which is obtained when processing designated by the source program is executed in advance, and the loop analysis section 270 analyzes a loop portion repeatedly executed. If the allocation priority generation section 290 determines that the variable is frequently used on the basis of the execution record information or information on the loop portion (S430: YES), it generates register preference information indicating that the variable is allocated to the register with priority over the variables used only in other portions (S440).

Also, the compiler 10 performs processing described below if the source program is converted into instructions having a memory access instruction such as a paired load and a paired store for transfer of data to or from the memory at consecutive addresses (e.g., instructions symbolized as LDD and STD). If the allocation priority generation section 290 detects a plurality of the variables requiring transfer of data to or from the memory at consecutive addresses in the source program (S450: YES), it generates variable relation information for assigning these variables to a plurality of the registers with which a combination memory access instruction can be used (S460).

Subsequently, if the identical register allocation detection section 260 detects a combination of some of the variables such that the speed of execution of the instructions is increased if the variables in the combination are allocated to the same register (S470: YES), it generates variable relation information designating allocation of the variables in the combination to the same register with priority (S480). For example, if the identical register allocation detection section 260 detects a statement for substitution of one of the variables for another of the variables in the source program, it sets the one and another of the variables in such a combination that the speed of execution of the instructions is improved if these variables are allocated to the same register. That is, if these variables are allocated to the same register, the identical register allocation detection section 260 can provide a possibility of deletion of the substitution statement to another optimization processing. Thus, the allocation priority generation section 290, using the identical register allocation detection section 260, the loop analysis section 270 and the execution record information acquisition section 280, can generate allocation priorities indicating to which one of the plurality of registers each variable is allocated with priority.

Figure 5:
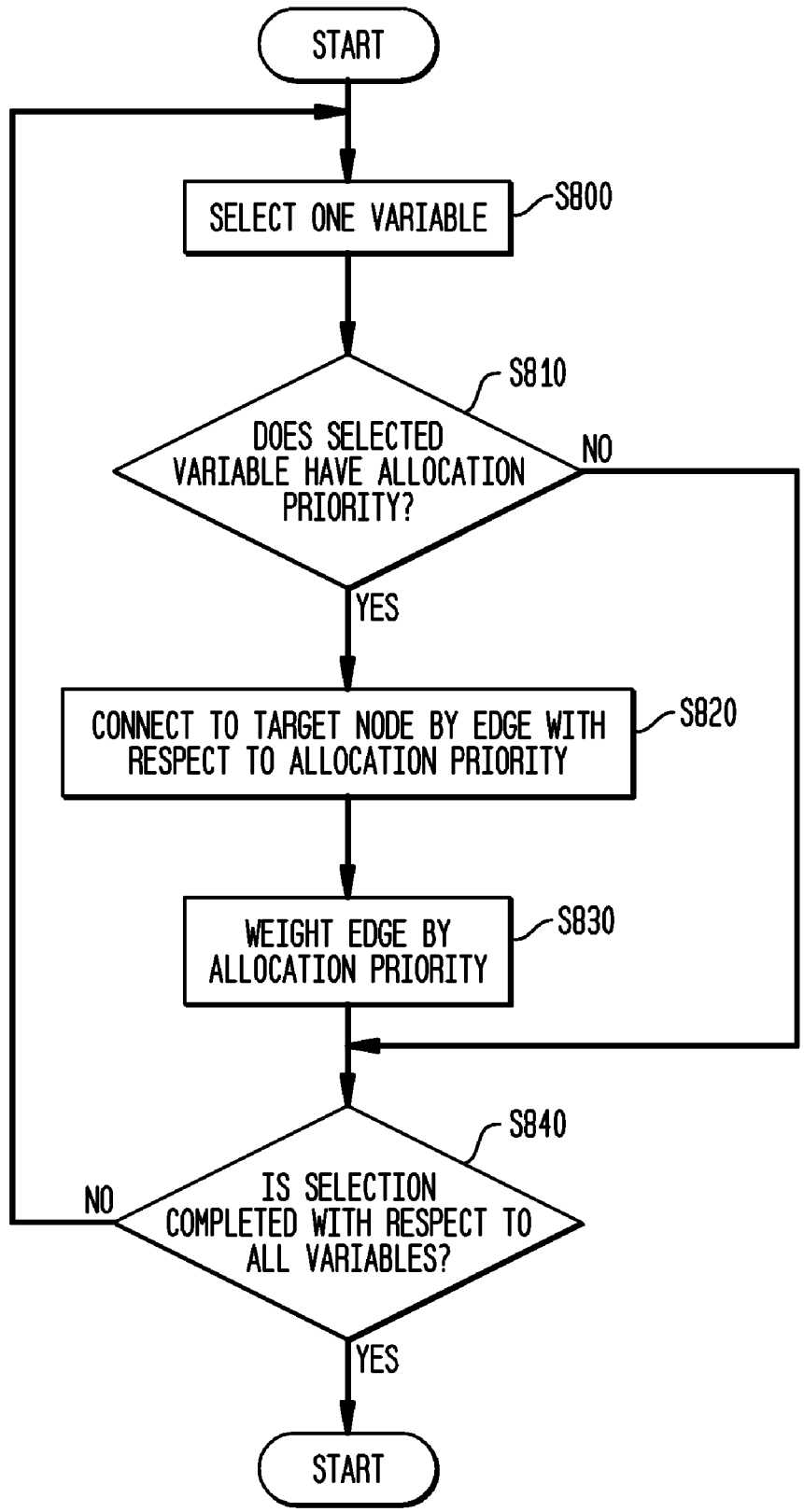
FIG. 5 is a flowchart showing an operation in S55.

FIG. 5 is a flowchart showing an example of the operation in S55. The allocation priority generation section 290 may form a graph indicating register preference and a variable relationship as an example of the data structure in which allocation priority information is shown. For example, the allocation priority generation section 290 makes, by operations described below, a graph in which nodes represent kinds of variable and kinds of register, and in which edges represent allocation priority information. The allocation priority generation section 290 first selects one of the plurality of variables (S800). If the allocation priority generation section 290 determines that the selected variable has allocation priority information with respect to some of the registers or the variables (S810: YES), it connects the selected variable to the node, which is the target of the allocation priority information, i.e., the variable or the register, by an edge (S820), and weights this edge by setting a value representing the degree of priority in association with the edge (S830). After this weighting, or if the allocation priority generation section 290 determines that the selected variable has no allocation priority information with respect to any of the registers or the variables (S810: NO), it makes a determination as to whether selection and allocation priority setting with respect to all the plurality of variables is completed (S340). If the allocation priority generation section 290 determines that selection and allocation priority setting with respect to all the plurality of variables is completed (S840: YES), the process returns to S800. If this determination result is not obtained (S340: NO), the process ends. Thus, the allocation priority generation section 290 expresses allocation priority information in a graph to enable the allocation priority information to be conveniently referred to.

Figure 6:
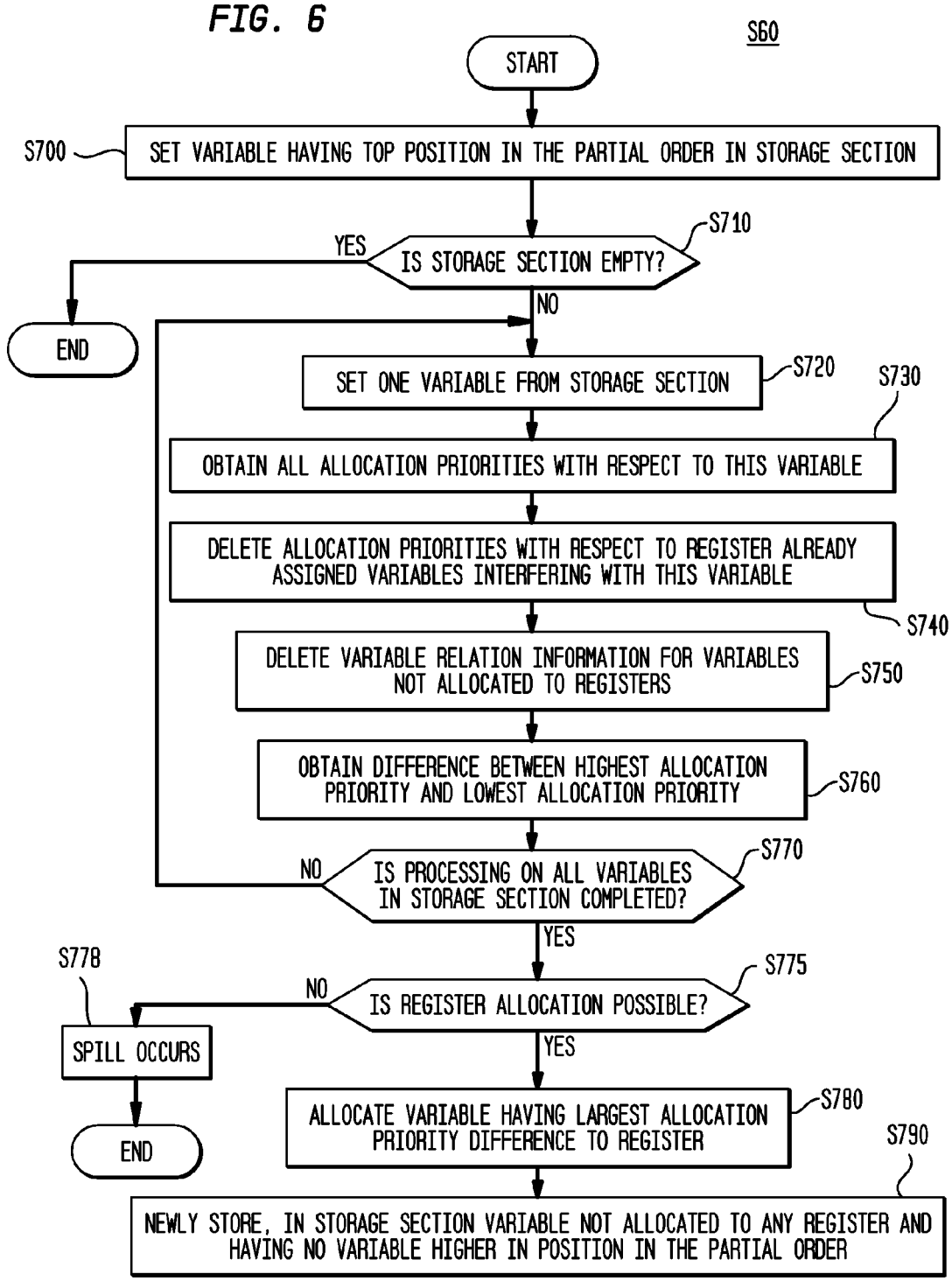
FIG. 6 is a flowchart showing an operation in S60.

FIG. 6 is a flowchart showing an example of the operation in S60. The storage section 500 identifies at least one simultaneously allocation candidate variable having the top position in the allocation sequences in the highest position in the partial order by referring to the allocation sequences, and stores the identified information of this variable (S700). The allocation repeating section 530 ends register allocation if it determines that the storage section 500 is empty (S710: YES). If the allocation repeating section 530 determines that the storage section 500 is not empty (S710: NO), the allocation selection section 510 selects one identification from the storage section 500 (S720), deletes this item from the storage section 500, and obtains, from the allocation priority acquisition section 300, information on all the allocation priorities of the simultaneously allocation candidate variable (e.g., variable V) corresponding to the identification (S730).

The allocation selection section 510 deletes identification on the register already allocated to all the interfering variables with the variable V and information on register preference with the variable V from the obtained allocation priority information (S740). Subsequently, the allocation selection section 510 deletes the variable relation information about the variables not yet assigned to any of the registers among all the variables having the variable relation information with respect to the variable V from the obtained allocation priority information (S750). The allocation execution section 520 computes the difference between the highest allocation priority and the lowest allocation priority and temporarily stores the computed difference by relating the computed difference to the information for identification of the variable V (S760). Subsequently, if the allocation execution section 520 determines that the processing from step S720 to S760 is not completed with respect to all the variables in the storage section 500, it continues processing by returning to S720.

If the allocation execution section 520 determines that the processing from step S720 to S760 is completed with respect to all the variables in the storage section 500 (S770, YES), it then makes a determination as to whether there is any variable assignable to some of the registers among the variables in the storage section 500 (S775). If the allocation execution section 520 determines that there is no register assignable variable (S775: NO), it sends to the register allocation possibility determination section 240 information that a spill indicating saving of the register values to the memory has occurred, and the process ends (S778). If the allocation execution section 520 determines that there are some register assignable variables (S775: YES), it identifies the variable having the maximum of the difference between the highest priority and the lowest priority temporarily stored and allocates the variable to the available register that has the highest allocation priority (S780). Subsequently, the variables that have no preceding variables not allocated to any of the registers in the partial order among those lower in position in the partial order than the simultaneously allocation candidate variables in the storage section 500 are newly stored in the storage section 500 (S790), and the process then returns to S710. Thus, the register allocation section 310 can allocate a plurality of variables to the registers in accordance with one allocation sequence selected by performing phase sorting (called topological sort, for example) of a partial order on the basis of allocation priorities while maintaining the register allocation partial order.

FIGS. 7(a), 7(b) and 7(c) show an example of a source program complied by the compiler 10. The source program shown in FIG. 7(a) has first to tenth statements 910 to 995. The first statement 910, the second statement 920, the third statement 930, the fourth statement 940, the fifth statement 950, the sixth statement 960 and the eighth statement 980 respectively represent substituting the content of the memory at an address arg0 for a variable v0, substituting the content at an address v0 for a variable v1, substituting the content at an address v0+4 for a variable v2, substituting the content at the address v0 for a variable v3, substituting the sum of the variable v1 and the variable v2 for a variable v4, substituting the content of the variable v3 for the variable arg0, and substituting the value obtained by adding 1 to the variable v4 for the variable v0. The seventh statement 970 represents calling a predetermined function and continuing the processing from the eighth statement 980 after the completion of processing by this function. The ninth statement 990 represents comparing the variable v0 and 0 and making a transition to the processing of the second statement 920 if the variable v0 is not equal to 0. The tenth statement 995 represents ending the execution of the source program shown in FIG. 7(a).

FIG. 7(b) shows the live ranges of the plurality of variables. The live range analysis section 210 generates the live ranges shown in FIG. 7(b) of the source program shown in FIG. 7(a) by using a technique such as data flow analysis. The first live range 810 is indicated by a straight line from the second statement 920 to the fourth statement 940 as an expression of an event in which the value of the variable v0 is substituted by the second statement 920 and an event in which the value is finally used by the fourth statement 940. The second live range 820 is indicated by a straight line from the second statement 920 to the fifth statement 950 as an expression of an event in which the value of the variable v1 is substituted by the second statement 920 and an event in which the value is finally used by the fifth statement 950. The third live range 830 is indicated by a straight line from the third statement 930 to the fifth statement 950 as an expression of an event in which the value of the variable v2 is substituted by the third statement 930 and an event in which the value is finally used by the fifth statement 950. The fourth live range 840 is indicated by a straight line from the fourth statement 940 to the sixth statement 960 as an expression of an event in which the value of the variable v3 is substituted by the fourth statement 940 and an event in which the value is finally used by the sixth statement 960.

The fifth live range 850 is indicated by a straight line from the fifth statement 950 to the eighth statement 980 as an expression of an event in which the value of the variable v4 is substituted by the fifth statement 950 and an event in which the value is finally used by the eighth statement 980. The sixth live range 860 is indicated by a straight line about the first statement 910 as an expression of an event in which the value of the variable arg0 is used by the first statement 910. The seventh live range 870 is indicated by a straight line from the sixth statement 960 to the seventh statement 970 as an expression of an event in which the value of the variable arg0 is substituted by the sixth statement 960 and an event in which the value is finally used by the seventh statement 970. The eighth live range 880 is indicated by a straight line from the second statement 920 to the fourth statement 940 as an expression of an event in which the value of the variable v0 is substituted by the second statement 920 and an event in which the value is finally used by the fourth statement 940.

FIG. 7(c) shows an example of an interference graph in which are indicated the plurality of variables used in the source program and information on the variables in a state of interfering with one of the plurality of variables when used simultaneously with the same. The simultaneously used variable acquisition section 220 generates information shown in the graph of FIG. 7(c) by using the live ranges shown in FIG. 7(b). The nodes indicated by v0 to v4 and arg0 respectively represent the variables with the indicated names. Edges connecting the plurality of nodes indicate that the variables respectively represented by the corresponding nodes are in a state of interfering with each other. For example, the variable v0 is in a state of interfering with the variable v1 and the variable v2. The variable v1 is in a state of interfering with the variable v2. The variable v3 is in a state of interfering with the variable v1, the variable v2, and the variable v4. The variable v4 is in a state of interfering with the variable arg0. Thus, the live range analysis section 210 computes the live ranges by analyzing the source program, and the simultaneously used variable acquisition section 220 can identify the variables simultaneously used.

Figures 8A, 8B:
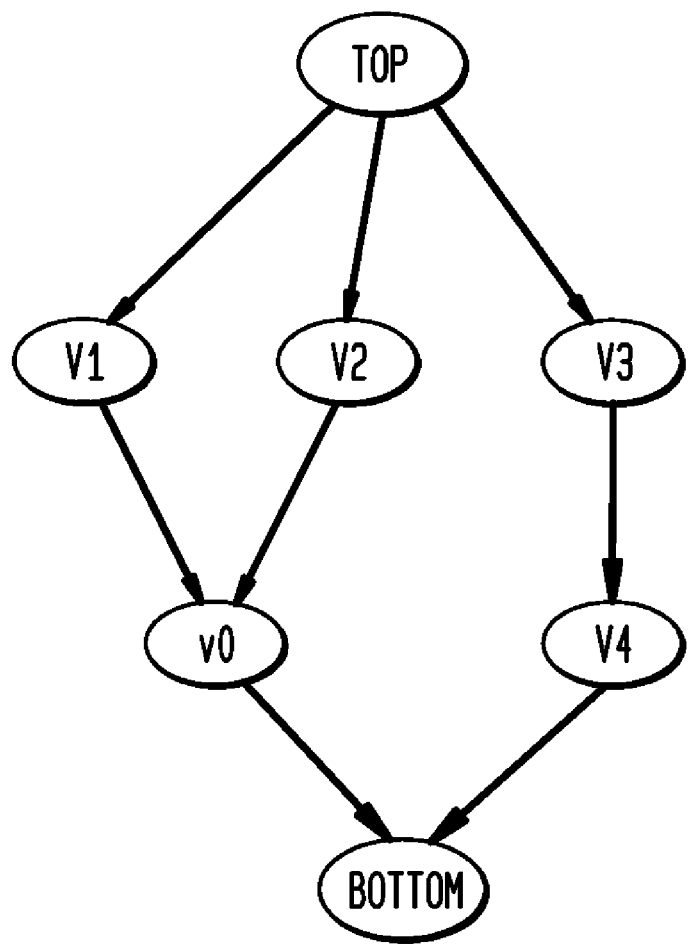
FIG. 8(a) is a diagram showing an example of allocation sequences generated by allocation sequence generation section 230.
FIG. 8(b) shows allocation sequences generated as a result of processing.

FIGS. 8(a) and 8(b) show an example of allocation sequences generated by the allocation sequence generation section 230. FIG. 8(a) shows the results of processing shown in S500 to S520 in FIG. 3 (the number N of registers is 3 in the illustrated example) after the allocation sequence generation section 230 has performed this processing on the graph in which the interfering states are indicated as shown in FIG. 7(c). That is, the allocation sequence generation section 230 stores the variable v0, the variable v4, the variable v1, the variable v2, and the variable v3 in order from the bottom of the stacked data structure, i.e., stack A.

FIG. 8(b) shows allocation sequences generated as a result of the processing from S530 to S610 of FIG. 3 performed by the allocation sequence generation section 230 on the basis of FIG. 8(a). Referring to FIG. 8(b), the nodes in the top positions in the partial order are connected to the node indicated by "TOP" by directional edges extending from this node to the nodes in the top positions. For example, the nodes representing the variable v1, the variable v2, and the variable v3 are connected to the node indicated by "TOP". The nodes representing the variable v1 and the variable v2 are connected to the node representing the variable v0 by directional edges extending from the variable v1 and the variable v2 to the variable v0. The node representing the variable v3 is connected to the node representing the variable v4 by a directional edge extending from the variable v3 to the variable v4. The variable v0 and the variable v4 in the last positions in the partial order are respectively connected to the node indicated by "BOTTOM" by directional edges from the variable v0 and the variable v4 to the node indicated by "BOTTOM". Each of the above-described directional edges indicates the allocation sequence in which the variable corresponding to the node at the directional edge connection root is allocated to a register before the variable corresponding to the node at the directional edge connection end. Thus, the allocation sequence generation section 230 can generate allocation sequences on the basis of the results of analysis of the source program.

Figure 9A:
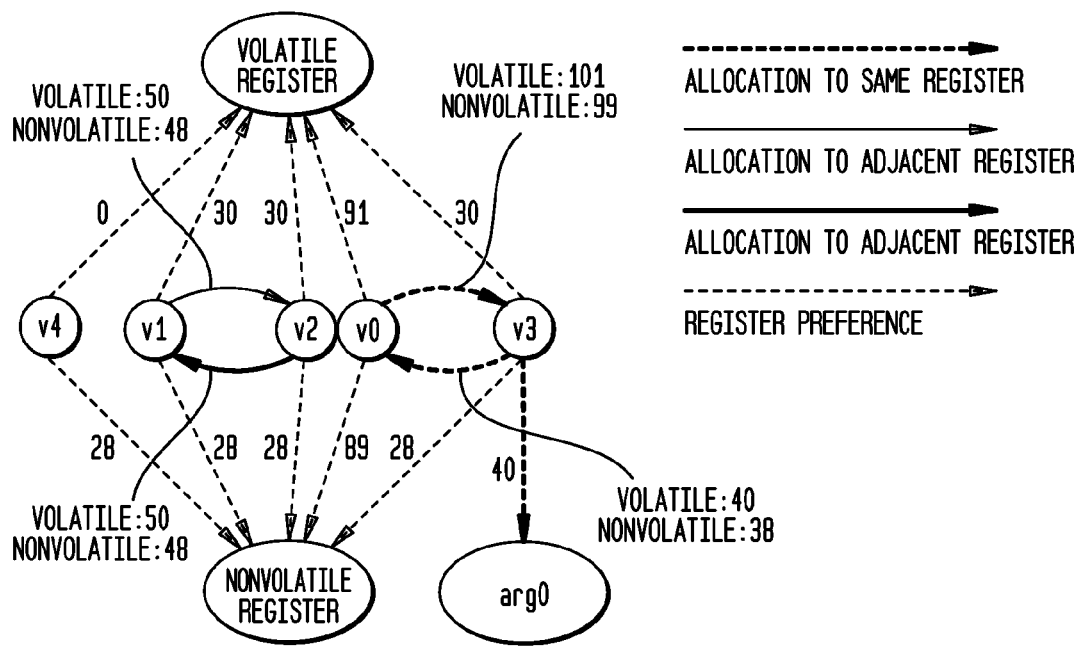
FIG. 9(a) is a diagram showing an example of allocation priorities generated by a register allocation section and an example of instructions generated by compiler.
Figure 9B:
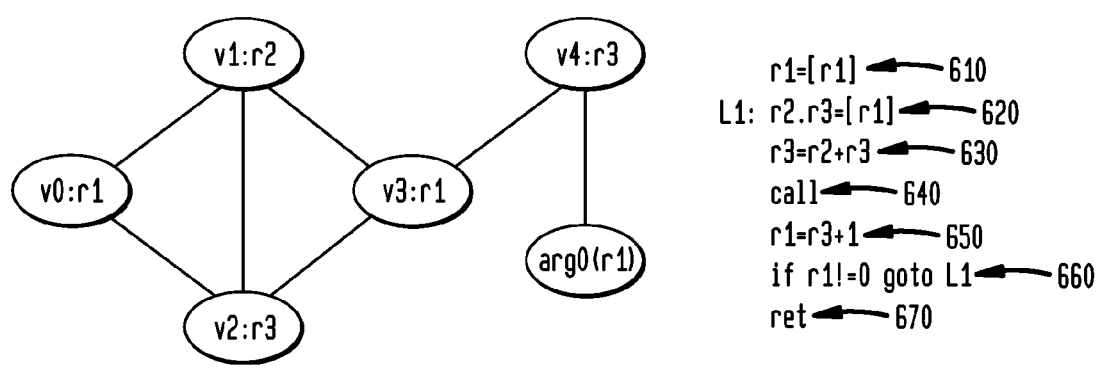
FIG. 9(b) shows results of allocation of variables to registers.

FIGS. 9(a) and 9(b) show an example of allocation priorities generated by the register allocation section 310 and instructions generated by the compiler 10. FIG. 9(a) shows, in a graph, allocation priorities generated by the register allocation section 310. The nodes indicated by v0 to v4 respectively represent the variables with the indicated names. The node indicated by "VOLATILE REGISTER" represents a volatile register which is a kind of register. Similarly, the node indicated by "NONVOLATILE REGISTER" represents a nonvolatile register which is a kind of register different from the volatile register. The node indicated by "arg0" represents a kind of register used for inter-function exchange of values. The variables in this figure respectively correspond to the registers with the same names shown in FIG. 7(a). The register r1 is determined in advance as a register used for exchange values between functions by a function call procedure. Therefore the variable arg0 is assumed to be assigned to the register r1 in advance. Edges connecting the nodes indicate allocation priorities. For example, the edge between the nodes representing the variable v0 and "VOLATILE REGISTER" represents register preference information and indicates that the allocation priority is 91. The edge connecting the nodes representing the variable v1 and the variable v2 represents variable relation information and indicates that the allocation priority of the variable v2 when the variable v2 is allocated to the register adjacent to the variable v1 is 50 or 48. More specifically, in a case where the variable v1 has already been allocated to the nonvolatile register, and where the variable v2 is allocated to the register next to that assigned the variable v1, the allocation priority of the variable v2 is 48. On the other hand, in a case where the variable v1 has already been allocated to the volatile register, and where the variable v2 is allocated to the register next to that assigned the variable v1, the allocation priority of the variable v2 is 50. Similarly, the allocation priority of the variable v3 when the variable v3 is allocated to the same register as that assigned the variable v0 is 40 or 38.

The above-described allocation priorities are generated by the operations shown in FIGS. 4 and 5. For example, since the variable v4 is used before and after a function call, allocation of the variable v4 to the nonvolatile register is given priority over that to the volatile register (for example, the priority with which the variable is allocated to the nonvolatile register is 28, while the priority with which the variable is allocated to the volatile register is 0). Thus, the allocation priority generation section 290 generates allocation priorities between the variables and the kinds of register with respect to each of combinations of the variables and the registers. Therefore the register allocation section 310 can allocate the variables to the registers according to the allocation priorities between the variables and the kinds of registers, e.g., an argument register and a volatile register.

FIG. 9(b) shows the results of allocation of the variables to the registers performed by the register allocation section 310 on the basis of FIG. 9(a) and FIG. 8(b). The register allocation section 310 allocate the variable v0, the variable v1, the variable v2, the variable v3, the variable v4, and the variable arg0 to the register r1, the register r2, the register r3, the register r1, the register r3, and the register r1, respectively. Accordingly, the register allocation section 310 can assign each variable to one of the registers different from the registers to which some of the other variables used simultaneously with the variable are allocated. Thus, the register allocation device 200 allocates the variables to the registers on the basis of allocation priorities while maintaining register allocation sequences to enable generation of instructions which is to be executed at a high speed.

Figure 10:
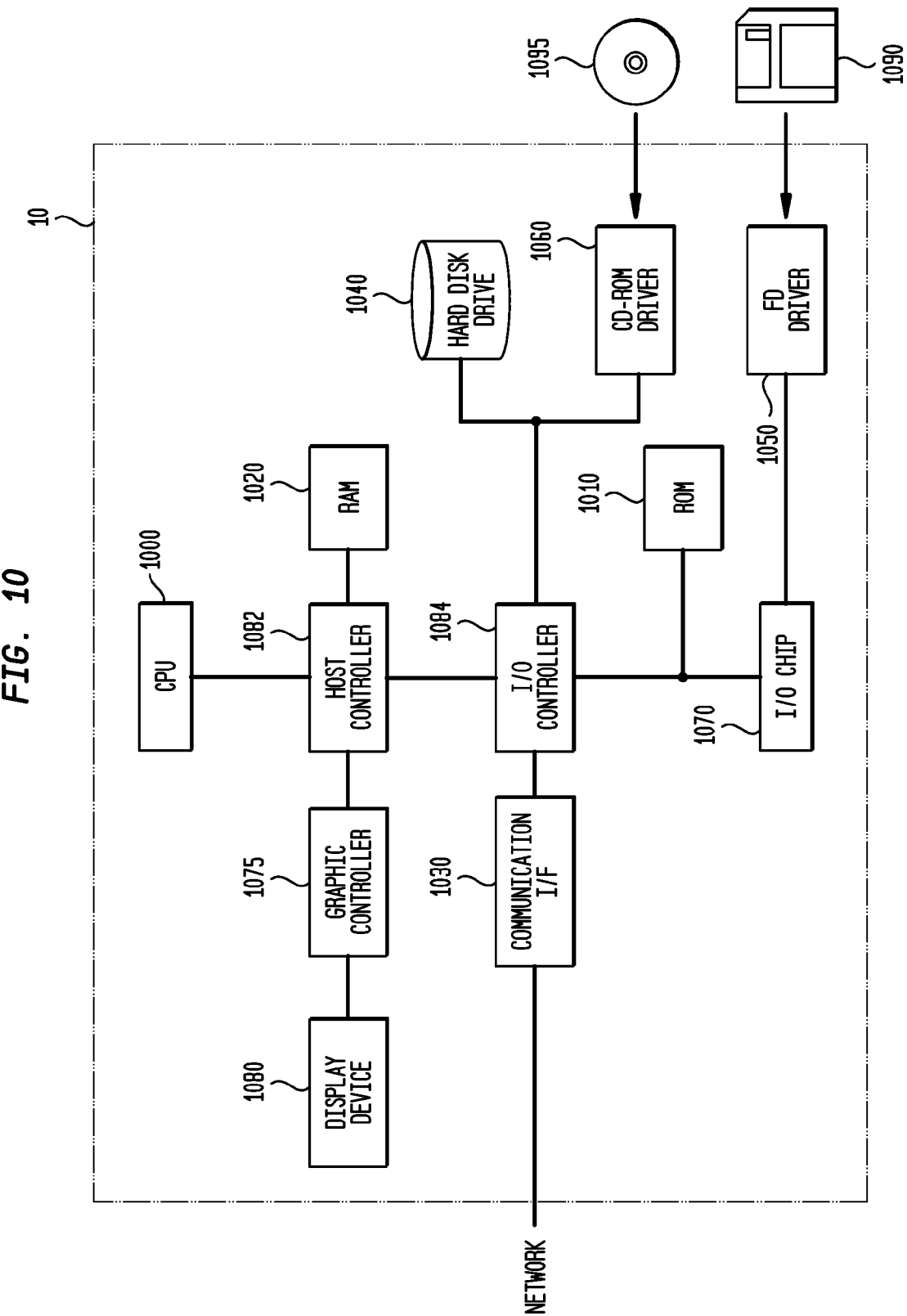
FIG. 10 is a diagram showing an example of the hardware configuration of compiler 10.

FIG. 10 shows an example of the hardware configuration of the compiler 10. The compiler 10 according to this embodiment is provided with a CPU peripheral having a CPU 1000, a RAM 1020, a graphic controller 1075, and a display device 1080. These components are connected to each other by a host controller 1082. The compiler 10 is also provided with an input/output section having a communication interface 1030, a hard disk drive 1040, and a CD-ROM drive 1060. These components are connected to the host controller 1082 by an input/output controller 1084. The compiler 10 is further provided with a legacy input/output section having a ROM 1010, a floppy disk drive 1050, and input/output chip 1070. These components are connected to the input/output controller 1084.

The host controller 1082 is connected to the RAM 1020 and to the CPU 1000 and the graphic controller 1075 each accessing the RAM 1020 at a high transfer rate. The CPU 1000 operates on the basis of programs stored in the ROM 1010 and the RAM 1020 to control each section. The graphic controller 1075 obtains image data generated on a frame buffer provided in the RAM 1020 by the CPU 1000 or the like, and displays the obtained image data on the display device 1080. Alternatively, the graphic controller 1015 may incorporate a frame buffer for storing image data generated by the CPU 1000 or the like.

The input/output controller 1084 connects the host controller 1082 to the communication interface 1030, the hard disk drive 1040, and the CD-ROM drive 1060, which are input/output devices of a comparatively high speed. The communication interface 1030 communicates with an external device via a network. The hard disk drive 1040 stores programs and data used by the compiler 10. The CD-ROM drive 1060 reads a program or data from a CD-ROM 1095 and supplies the program or data to the input/output chip 1070 through the RAM 1020.

To the input/output controller 1084 are also connected the ROM 1010, the floppy disk drive 1050, the input/output chip 1070, etc., which are input/output devices of a comparatively low speed. The ROM 1010 stores a boot program executed by the CPU 1000 at the time of startup of the compiler 10, a program dependent on hardware in a personal computer main unit 110, etc. The floppy disk drive 1050 reads a program or data from a floppy disk 1090, and supplies the program or data to the input/output chip 1070 through the RAM 1020. The input/output chip 1070 connects the floppy disk 1090 and also connects various input and output devices, for example, through a parallel port, a serial port, and keyboard and mouse ports.

A program realizing the compiler 10 has various optimization processing modules, a register allocation program, a live range analysis module, a simultaneously used variable acquisition module, an allocation sequence generation module, a register allocation possibility determination module, an identical register allocation module, a loop analysis module, an execution record information acquisition module, an allocation priority generation module, an allocation priority acquisition module, an interference graph generation module, a first selection module, a second selection module, a sequence determination module, a storage module, an allocation selection module, an allocation execution module, an allocation repeating module, and an execution code generation module.

These modules are programs for making the compiler 10 operate as the optimization processing section 100, the register allocation device 200, the live range analysis section 210, the simultaneously used variable acquisition section 220, the allocation sequence generation section 230, the register allocation possibility determination section 240, the identical register allocation detection section 260, the loop analysis section 270, the execution record information acquisition section 280, the allocation priority generation section 290, the allocation priority acquisition section 300, the register allocation section 310, the interference graph generation section 400, the first selection section 410, the second selection section 420, the sequence determination section 430, the storage section 500, the allocation selection section 510, the allocation execution section 520, and the allocation repeating section 530.

The program provided to the compiler 10 is provided by a user in a state of being stored on a recording medium, e.g., the floppy disk 1090, the CD-ROM 1095, or an IC card. This program is read out from the recording medium and is installed in a storage system 200 and a backup device 300 through the input/output chip 1070 to be executed in the storage system 200 and the backup device 300. Alternatively, each of the storage system 200 and the backup device 300 may be further provided with a floppy disk drive, a CD-ROM drive, an IC card reader or the like and may read out the program directly from the recording medium.

The above-described program or modules may be stored on an external storage medium. As the storage medium, an optical recording medium such as a DVD or a PD, a magneto-optical recording medium such as a MD, a tape medium, a semiconductor memory such as an IC card, or the like may be used as well as the floppy disk 1090 and the CD-ROM 1095. Also, a hard disk, a storage device such as a RAM, or the like provided in a server system connected to a special-purpose communication network or the Internet may be used as a recording medium to provide the program to the compiler 10 via the network.

As is apparent from the foregoing, the compiler 10 can be arranged to reduce the number of times saving to registers and retrieval from the registers are performed and to enable variables to be allocated to suitable registers, thus making it possible to improve the speed of execution of instructions generated.

While the present invention has been described by using the embodiment, the technical scope of the present invention is not limited to the scope described with respect to the embodiment. Various changes or improvements can be made in the above-described embodiment. From the description in the appended claims, it is apparent that modes of implementation the invention using such changes and improvements are also included in the technical scope of the present invention.

According to the above-described embodiment, a compiler, a register allocation device, a program, a recording medium, a compilation method and a register allocation method described as items shown below are realized.

(Item 1) A compiler which converts a source program into instructions for a processor, the compiler having a simultaneously used variable acquisition section which obtains, with respect to each of a plurality of variables used in the source program, some of the other variables used simultaneously with the variable, an allocation sequence generation section which generates a plurality of allocation sequences between the plurality of variables to allocate each variable to one of the plurality of registers different from those to which some of the other variables used simultaneously with the variable are allocated, an allocation priority acquisition section which obtains allocation priorities indicating to which one of the plurality of registers each variable is allocated with priority, and a register allocation section which allocates the plurality of variables to the registers in accordance with one of the allocation sequences selected on the basis of the allocation priorities.

(Item 2) The compiler according to Item 1, wherein the allocation sequence generation section generates a partial order of allocation between the plurality of variables to allocate each variable to one of the plurality of registers different from those to which some of the other variables used simultaneously with the variable are allocated, and the register allocation section allocates the plurality of variables to the plurality of registers in accordance with an allocation sequence selected on the basis of certain allocation priorities while maintaining the partial order.

(Item 3) The compiler according to Item 2, wherein the allocation sequence generation section includes a first selection section which selects some of the variables used simultaneously only with the number of the variables smaller than the total number of the registers, a second selection section which selects some of the variables used simultaneously only with the number of the variables smaller than the total number of the registers among the variables excluding the variables already selected, and a sequence determination section which generates a partial order in such a manner that when processing by the second selection section is applied to each variable, the variable is set subsequent in the partial order to some of the other variables made selectable by excluding the variable.

(Item 4) The compiler according to Item 2, further having a register allocation possibility determination section which generates new variables by dividing at least one of the variables into at least two variables if it determines that each variable can not be allocated to the register different from those to which some of the other variables used simultaneously with the variable are allocated, the register allocation possibility determination section repeating the execution with the new variables by the simultaneously used variable acquisition section, the allocation sequence generation section, and the register allocation section.

(Item 5) The compiler according to Item 2, wherein the register allocation section includes a storage section which stores at least one simultaneously allocation candidate variable in the top position in the partial order in the partial order, an allocation selection section which selects the one simultaneously allocation candidate variable among said at least one simultaneously allocation candidate variables on the basis of the allocation priorities, an allocation execution section which removes the one simultaneously allocation candidate variable from the storage section, and allocates the candidate variable to a register selected on the basis of the allocation priorities, and an allocation repeating section which newly stores in the storage section some of the variables that have no preceding variables not allocated to any of the registers in the partial order among those lower in position in the partial order than the one simultaneously allocation candidate variable, and which repeats processing by the allocation execution section until the storage section becomes empty.

(Item 6) The compiler according to Item 5, wherein the allocation execution section selects, as the simultaneously allocation candidate variable in the at least one simultaneously allocation candidate variables, one of the variables having the maximum of the difference between the highest allocation priority and the lowest allocation priority in the allocation priorities with respect to the register not assigned the variable simultaneously used, and assigns the selected variable to the available register that has the highest allocation priority.

(Item 7) The compiler according to Item 1, further having an allocation priority generation section which generates, as the allocation priorities for allocation of each variable to one of the plurality of registers, at least one of register preference information indicating to which kind of register the variable should be allocated and variable relation information which is information indicating the relationship between the variable and the other variables on the source program, on the basis of the way in which the variable is used in the source program.

(Item 8) A compiler which converts a source program into instructions for a processor, the compiler having an allocation priority generation section which generates, as allocation priorities for allocation of each of a plurality of variables used in the source program to one of a plurality of registers, at least one of register preference information indicating to which kind of register the variable should be allocated and variable relation information which is information indicating the relationship between the variable and the other variables on the source program, on the basis of the way in which the variable is used in the source program, and a register allocation section which allocates the plurality of variables to the plurality of registers on the basis of the allocation priorities.

(Item 9) The compiler according to Item 8, wherein the register allocation section allocates to the register, with priority, the variables having the maximum of the difference between the highest allocation priority and the lowest allocation priority among the plurality of variables.

(Item 10) The compiler according to Item 8, wherein the allocation priority generation section generates register preference information indicating that the variable should be allocated with priority to some of the registers not used in the function if it is determined that the variable is used before a call for the function and after the call for the function.

(Item 11) The compiler according to Item 8, wherein the allocation priority generation section generates register preference information indicating that the variable should be allocated with priority to an argument register or a return value register prescribed in a function call procedure of the instructions if it is determined that the variable is used for handover of values between functions.

(Item 12) The compiler according to Item 8, further having an execution record information acquisition section which obtains execution record information which can be obtained in advance when the processing in accordance with the source program is executed, wherein the allocation priority generation section generates, on the basis of the execution record information, register preference information indicating that one of the variables used in a portion of the source program executed with higher frequency should be allocated to the register with priority over the variables used only in other portions.

(Item 13) The compiler according to Item 8, further having a loop analysis section which analyzes a loop portion repeatedly executed in the source program, wherein the allocation priority generation section generates register preference information indicating that one of the variables used in the loop portion should be allocated to the register with priority over the variables used in portions other than the loop portion.

(Item 14) The compiler according to Item 8, wherein the compiler converts the source program into the instructions having a memory access instruction for transfer of data between the plurality of registers and a memory at consecutive addresses, and wherein the allocation priority generation section generates variable relation information which enables the plurality of variables in the source program transferring data to or from the memory at consecutive addresses to be allocated to the plurality of registers to which the combined memory access instruction can be applied.

(Item 15) The compiler according to Item 8, further having an identical register allocation detection section which detects a combination of some of the plurality of variables such that if the variables in the combination are allocated to the same register, the speed of execution of the instructions is increased, wherein the allocation priority generation section generates variable relation information of the variables in the combination detected by the identical register allocation detection section to be applied to the one register.

(Item 16) A program for making a computer operate as a compiler according to any one of Items 1 to 15.

(Item 17) A register allocation apparatus which allocates a plurality of variables used in a source program to registers used in instructions for a processor, the apparatus having a simultaneously used variable acquisition section which obtains, with respect to each variable, some of the other variables used simultaneously with the variable, an allocation sequence generation section which generates a plurality of allocation sequences between the plurality of variables to allocate each variable to one of the plurality of registers different from those to which some of the other variables used simultaneously with the variable are allocated, an allocation priority acquisition section which obtains allocation priorities indicating to which one of the plurality of registers each variable is allocated with priority, and a register allocation section which allocates the plurality of variables to the registers in accordance with one of the allocation sequences selected on the basis of the allocation priorities.

(Item 18) A register allocation apparatus which converts a plurality of variables used in a source program into registers used in instructions for a processor, the apparatus having an allocation priority generation section which generates, as allocation priorities for allocation of each variable to one of the plurality of registers, at least one of register preference information indicating to which kind of register the variable should be allocated and variable relation information which is information indicating the relationship between the variable and the other variables on the source program, on the basis of the way in which the variable is used in the source program, and a register allocation section which allocates the plurality of variables to the plurality of registers on the basis of the allocation priorities.

(Item 19) A program for realizing the register allocation apparatus according to any one of Items 17 to 18 by a computer.

(Item 20) A recording medium on which a program for making a computer operate as a compiler for converting a source program into instructions for a processor, the program having a simultaneously used variable acquisition section which obtains, with respect to each of a plurality of variables used in the source program, some of the other variables used simultaneously with the variable, an allocation sequence generation section which generates a plurality of allocation sequences between the plurality of variables to allocate each variable to one of the plurality of registers different from those to which some of the other variables used simultaneously with the variable are allocated, an allocation priority acquisition section which obtains allocation priorities indicating to which one of the plurality of registers each variable is allocated with priority, and a register allocation section which allocates the plurality of variables to the registers in accordance with one of the allocation sequences selected on the basis of the allocation priorities.

(Item 21) A recording medium on which a program for making a computer operate as a compiler for converting a source program into instructions for a processor, the program having an allocation priority generation section which generates, as allocation priorities for allocation of each of a plurality of variables used in the source program to one of the plurality of registers, at least one of register preference information indicating to which kind of register the variable should be allocated and variable relation information which is information indicating the relationship between the variable and the other variables on the source program, on the basis of the way in which the variable is used in the source program, and a register allocation section which allocates the plurality of variables to the plurality of registers on the basis of the allocation priorities.

(Item 22) A recording medium on which a program for making a computer operate as a register allocation apparatus for allocating a plurality of variables used in a source program to registers used in instructions for a processor, the program having a simultaneously used variable acquisition section which obtains, with respect to each variable, some of the other variables used simultaneously with the variable, an allocation sequence generation section which generates a plurality of allocation sequences between the plurality of variables to allocate each variable to one of the plurality of registers different from those to which some of the other variables used simultaneously with the variable are allocated, an allocation priority acquisition section which obtains allocation priorities indicating to which one of the plurality of registers each variable is allocated with priority, and a register allocation section which allocates the plurality of variables to the registers in accordance with one of the allocation sequences selected on the basis of the allocation priorities.

(Item 23) A recording medium on which a program for making a computer operate as a register allocation apparatus for allocating a plurality of variables used in a source program to registers used in instructions for a processor, the program having an allocation priority generation section which generates, as allocation priorities for allocation of each variable to one of the plurality of registers, at least one of register preference information indicating to which kind of register the variable should be allocated and variable relation information which is information indicating the relationship between the variable and the other variables on the source program, on the basis of the way in which the variable is used in the source program, and a register allocation section which allocates the plurality of variables to the plurality of registers on the basis of the allocation priorities.

(Item 24) A compilation method of converting a source program into instructions for a processor, the method having a step of obtaining, with respect to each of a plurality of variables used in the source program, some of the other variables used simultaneously with the variable, a step of generating a plurality of allocation sequences between the plurality of variables to allocate each variable to one of the plurality of registers different from those to which some of the other variables used simultaneously with the variable are allocated, a step of obtaining allocation priorities indicating to which one of the plurality of registers each variable is allocated with priority, and a step of allocating the plurality of variables to the registers in accordance with one of the allocation sequences selected on the basis of the allocation priorities.

(Item 25) A compilation method of converting a source program into instructions for a processor, the method having a step of generating, as allocation priorities for allocation of each of a plurality of variables used in the source program to one of a plurality of registers, at least one of register preference information indicating to which kind of register the variable should be allocated and variable relation information which is information indicating the relationship between the variable and the other variables on the source program, on the basis of the way in which the variable is used in the source program, and a step of allocating the plurality of variables to the plurality of registers on the basis of the allocation priorities.

(Item 26) A register allocation method of allocating a plurality of variables used in a source program to registers used in instructions for a processor, the method having a step of obtaining, with respect to each variable, some of the other variables used simultaneously with the variable, a step of generating a plurality of allocation sequences between the plurality of variables to allocate each variable to one of the plurality of registers different from those to which some of the other variables used simultaneously with the variable are allocated, a step of obtaining allocation priorities indicating to which one of the plurality of registers each variable is allocated with priority, and a step of allocating the plurality of variables to the registers in accordance with one of the allocation sequences selected on the basis of the allocation priorities.

(Item 27) A register allocation method of converting a plurality of variables used in a source program into registers used in instructions for a processor, the method comprising a step of generating, as allocation priorities for allocation of each variable to one of the plurality of registers, at least one of register preference information indicating to which kind of register the variable should be allocated and variable relation information which is information indicating the relationship between the variable and the other variables on the source program, on the basis of the way in which the variable is used in the source program, and a step of allocating the plurality of variables to the plurality of registers on the basis of the allocation priorities. Thus, according to the present invention, as is apparent from the foregoing, a compiler and a compilation method in which suitable registers are assigned to a plurality of variables can be realized. Variations described for the present invention can be realized in any combination desirable for each particular application. Thus particular limitations, and/or embodiment enhancements described herein, which may have particular advantages to the particular application need not be used for all applications. Also, not all limitations need be implemented in methods, systems and/or apparatus including one or more concepts of the present invention.

The present invention can be realized in hardware, software, or a combination of hardware and software. A visualization tool according to the present invention can be realized in a centralized fashion in one computer system, or in a distributed fashion where different elements are spread across several interconnected computer systems. Any kind of computer system—or other apparatus adapted for carrying out the methods and/or functions described herein—is suitable. A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which—when loaded in a computer system—is able to carry out these methods. Computer program means or computer program in the present context include any expression, in any language, code or notation, of a set of instructions intended to cause a system having an information processing capability to perform a particular function either directly or after conversion to another language, code or notation, and/or reproduction in a different material form.

Thus the invention includes an article of manufacture which comprises a computer usable medium having computer readable program code means embodied therein for causing a function described above. The computer readable program code means in the article of manufacture comprises computer readable program code means for causing a computer to effect the steps of a method of this invention. Similarly, the present invention may be implemented as a computer program product comprising a computer usable medium having computer readable program code means embodied therein for causing a a function described above. The computer readable program code means in the computer program product comprising computer readable program code means for causing a computer to effect one or more functions of this invention. Furthermore, the present invention may be implemented as a program storage device readable by machine, tangibly embodying a program of instructions executable by the machine to perform method steps for causing one or more functions of this invention.

It is noted that the foregoing has outlined some of the more pertinent aspects and embodiments of the present invention. This invention may be used for many applications. Thus, although the description is made for particular arrangements and methods, the intent and concept of the invention is suitable and applicable to other arrangements and applications. It will be clear to those skilled in the art that modifications to the disclosed embodiments can be effected without departing from the spirit and scope of the invention. The described embodiments ought to be construed to be merely illustrative of some of the more prominent features and applications of the invention. Other beneficial results can be realized by applying the disclosed invention in a different manner or modifying the invention in ways known to those familiar with the art.

We claim:

1. A compiler computer apparatus comprising:
   a processor;
   a compiler converts a source program into instructions for the processor;
   a simultaneously used variable acquisition section which obtains, with respect to each of a plurality variables used in the source program, one or more other variables used simultaneously with the each of the plurality variables;
   an allocation sequence generation section which generates a plurality of allocation sequences between the each of plurality variables to allocate the each of the plurality variables to one of the plurality registers different from registers to which said one or more other variables used simultaneously with said each of the plurality variables are allocated;
   an allocation priority acquisition section which obtains allocation priorities indicating to which one register from the plurality registers the each of plurality variables is allocated with priority;
   a register allocation section which allocates the plurality variables to the plurality registers in accordance with one of the allocation sequences selected on basis of the allocation priorities;
   a register allocation possibility determination section which generates new variables by dividing at least one of the plurality variables into at least two variables if determined that the at least one of the plurality variables cannot be allocated to a registers different from the registers to which said one or more other variables used simultaneously with the each of the plurality of variables are allocated; and
   an allocation execution section which selects a simultaneously allocation candidate variable from simultaneously allocation candidate variables, one of allocation candidate variables having a maximum of difference between the highest allocation priority and the lowest allocation priority in the allocation priorities with respect to registers not assigned as simultaneously used variable, and assigns the selected simultaneously allocation candidate variable to a register that has the highest allocation priority.

2. The compiler as recited on claim 1, wherein said allocation sequence generation section generates a partial order of allocation between the plurality of variables to allocate each variable to one of the plurality of registers different from those to which said one or more other variables used simultaneously with the variable are allocated, and said register allocation section allocates the plurality of variables to the plurality of registers in accordance with an allocation sequence selected on the basis of certain allocation priorities while maintaining the partial order.

3. The compiler as recited on claim 2, wherein said allocation sequence generation section includes:
   a first selection section which selects some of the variables used simultaneously only with a number of the variables smaller than the total number of a registers;
   a second selection section which selects some of the variables used simultaneously only with the number of the variables smaller than the total number of the registers among the variables excluding variables already selected; and
   a sequence determination section which generates a partial order in such a manner that when processing by said second selection section is applied to each variable, said each variable is set subsequent in the partial order to some of the other variables made selectable by excluding the variable.

4. The compiler as recited on claim 2, further comprising a register allocation possibility determination section which generates new variables by dividing at least one of the variables into at least two variables if it determines that each variable can not be allocated to the register different from those to which said one or more other variables used simultaneously with the variable are allocated, wherein said register allocation possibility determination section repeating the execution with the new variables by said simultaneously used variable acquisition section, said allocation sequence generation section, and said register allocation section.

5. The compiler as recited on claim 2, wherein said register allocation section includes:
   a storage section which stores at least one simultaneously allocation candidate variable in a top position in the partial order; an allocation selection section which selects one simultaneously allocation candidate variable among said at least one simultaneously allocation candidate variables on the basis of the allocation priorities;
   an allocation execution section which removes the one simultaneously allocation candidate variable from said storage section, and allocates the candidate variable to a register selected on the basis of the allocation priorities; and
   an allocation repeating section which newly stores in the storage section some of the variables that have no preceding variables not allocated to any of the registers among those lower in position in the partial order than the one simultaneously allocation candidate variable, and which repeats processing by said allocation execution section until said storage section becomes empty.

6. The compiler as recited on claim 1, further comprising an allocation priority generation section which generates, as the allocation priorities for allocation of each variable to one of the plurality of registers, at least one portion of register preference information indicating to which kind of register the variable should be allocated and variable relation information which is information indicating the relationship between the variable and the other variables on the source program, on the basis of the way in which the variable is used in the source program.

7. A compiler computer apparatus comprising:
   a processor;
   a compiler converts a source program into instructions for the processor;
   an allocation priority generation section which generates allocation priorities for allocation of each of a plurality variables to one of a plurality registers, at least one portion of register preference information indicating to which kind of register the each of the plurality variables should be allocated and variable relation information which is information indicating the relationship between the each of the plurality variable and other variables on the source program, on basis of ways the each of the plurality variable is used in the source program;

a register allocation section which allocates the plurality variables to the plurality registers on the basis of the allocation priorities;

a register allocation possibility determination section which generates new variables by dividing at least one of the plurality variables into at least two variables if determined that the at least one of the plurality variable cannot be allocated to a register different from registers to which one or more other variables used simultaneously with the each of the plurality variables are allocated; and an allocation execution section which selects a simultaneously allocation candidate variable from simultaneously allocation candidate variables, one of allocation candidate variables having a maximum of difference between the highest allocation priority and the lowest allocation priority in the allocation priorities with respect to registers not assigned as simultaneously used variable, and assigns the selected simultaneously allocation candidate variable to a register that has the highest allocation priority.

8. The compiler as recited on claim 7, wherein said register allocation section allocates to the register, with priority, particular variables having a maximum of the difference between the highest allocation priority and the lowest allocation priority among the plurality of variables.

9. The compiler as recited on claim 7, wherein said allocation priority generation section generates register preference information indicating that the variables should be allocated with priority to one or more of the registers not used in the function if it is determined that the variable is used before a call for the function and after the call for the function.

10. The compiler as recited on claim 7, wherein said allocation priority generation section generates register preference information indicating that a particular variable should be allocated with priority to an argument register or a return value register prescribed in a function call procedure of instructions if it is determined that the particular variable is used for handover of values between functions.

11. The compiler as recited on claim 7, further comprising an execution record information acquisition section which obtains execution record information which can be obtained in advance when the processing in accordance with the source program is executed, wherein said allocation priority generation section generates, on the basis of the execution record information, register preference information indicating that one of the variables used in a portion of the source program executed with higher frequency should be allocated to the register with priority over the variables used only in other portions.

12. The compiler as recited on claim 7, further comprising a loop analysis section which analyzes a loop portion repeatedly executed in the source program, wherein said allocation priority generation section generates register preference information indicating that one of the variables used in the loop portion should be allocated to the register with priority over the variables used in portions other than the loop portion.

13. The compiler as recited on claim 7, wherein the compiler converts the source program into the instructions having a memory access instruction for transfer of data between the plurality of registers and a memory at consecutive addresses, and wherein said allocation priority generation section generates variable relation information which enables the plurality of variables in the source program transferring data to or from the memory at consecutive addresses to be allocated to the plurality of registers to which the combined memory access instruction can be applied.

14. The compiler as recited on claim 7, further comprising an identical register allocation detection section which detects a combination of some of the plurality of variables such that if the variables in the combination are allocated to the same register, the speed of execution of the instructions is increased, wherein said allocation priority generation section generates variable relation information of the variables in the combination detected by said identical register allocation detection section to be applied to the one register.

15. A program storage device readable by machine, tangibly embodying a program of instructions executable by the machine to perform functions for a compiler, said functions comprising the functions of the elements in claim 1.

16. A register allocation apparatus comprising:
a processor, said register allocation apparatus allocates a plurality variables used in a source program to a plurality registers used in instructions for the processor;
a simultaneously used variable acquisition section which obtains, with respect to each of the plurality variables, one or more other variables used simultaneously with the each of the plurality variables;
an allocation sequence generation section which generates a plurality of allocation sequences between the plurality variables to allocate the each variable of the plurality variables to one of the plurality registers different from registers to which the one or more other variables used simultaneously with the each of the plurality variables are allocated;
an allocation priority acquisition section which obtains allocation priorities indicating to which one of the plurality ef-registers each variable is allocated with priority;
a register allocation section which allocates the plurality variables to the plurality registers in accordance with one of the allocation sequences selected on basis of the allocation priorities;
a register allocation possibility determination section which generates new variables by dividing at least one of the plurality variables into at least two variables if determined that the at least one of the plurality variable cannot be allocated to a register different from the registers to which the one or more other variables used simultaneously with the variable are allocated; and
an allocation execution section which selects a simultaneously allocation candidate variable from simultaneously allocation candidate variables, one of allocation candidate variables having a maximum of difference between the highest allocation priority and the lowest allocation priority in the allocation priorities with respect to registers not assigned as simultaneously used variable, and assigns the selected simultaneously allocation candidate variable to a register that has the highest allocation priority.

17. A register allocation apparatus comprising:
a processor, said register allocation apparatus converts a plurality variables used in a source program into a plurality registers used in instructions for the processor;
an allocation priority generation section which generates allocation priorities for allocation of each of plurality variables to one of the plurality registers, at least one of register preference information indicating to which kind of register the each of the plurality variables should be allocated and variable relation information indicating relationship between the each of the plurality variables and other variables in the source program, on basis of ways the each of the plurality variables is used in the source program;

a register allocation section which allocates the plurality variables to the plurality registers on basis of the allocation priorities;

a register allocation possibility determination section which generates new variables by dividing at least one of the plurality variables into at least two variables if determined that the at least one of the plurality variable cannot be allocated to a register different from registers to which one or more other variables used simultaneously with the variable are allocated; and an allocation execution section which selects a simultaneously allocation candidate variable from simultaneously allocation candidate variables, one of allocation candidate variables having a maximum of difference between the highest allocation priority and the lowest allocation priority in the allocation priorities with respect to registers not assigned as simultaneously used variable, and assigns the selected simultaneously allocation candidate variable to a register that has the highest allocation priority.

18. A computer program product comprising a storage device readable by computer having computer readable program code means embodied therein for causing a register allocation apparatus, the computer readable program code means in said computer program product comprising computer readable program code means for causing a computer to effect the functions of claim 16.

19. A computer program product comprising a computer storage device readable by computer having computer readable program code means embodied therein for causing a computer to operate as a compiler for converting a source program into instructions for a processor, the computer readable program code means in said computer program product comprising computer readable program code means for causing a computer to effect the functions of claim 1.

20. A computer program product comprising a computer storage device readable by computer having computer readable program code means embodied therein for causing a computer to operate as a compiler for converting a source program into instructions for a processor, the computer readable program code means in said computer program product comprising computer readable program code means for causing a computer to effect the functions of claim 7.

21. A computer program product comprising a computer storage device readable by computer having computer readable program code means embodied therein for causing register allocation, the computer readable program code means in said computer program product comprising computer readable program code means for causing a computer to effect the functions of claim 16.

22. A computer program product comprising a computer storage device readable by computer having computer readable program code means embodied therein for causing register allocation, the computer readable program code means in said computer program product comprising computer readable program code means for causing a computer to effect the functions of claim 17.

23. A compilation method of converting a source program into instructions for a processor, said method comprising:

a step of obtaining, with respect to each of a plurality variables used in the source program, one or more other variables used simultaneously with the each of the plurality variables;

a step of generating a plurality of allocation sequences between the plurality variables to allocate the each variable of the plurality variables to one of the plurality registers different from registers to which said one or more of the other variables used simultaneously with the each of the plurality variables are allocated;

a step of obtaining allocation priorities indicating to which one of the plurality registers the each of the plurality variable is allocated with priority;

a step of allocating the plurality variables to the plurality registers in accordance with one of the allocation sequences selected on basis of the allocation priorities;

a step of generating new variables dividing at least one of the plurality variables into at least two variables if determined that the at least one of the plurality variables cannot be allocated to a registers different from the registers to which said one or more other variables used simultaneously with the each of the plurality of variables are allocated; and a step of selecting a simultaneously allocation candidate variable from simultaneously allocation candidate variables, one of allocation candidate variables having a maximum of difference between the highest allocation priority and the lowest allocation priority in the allocation priorities with respect to registers not assigned as simultaneously used variable, and assigns the selected simultaneously allocation candidate variable to a register that has the highest allocation priority.

24. A compilation method of converting a source program into instructions for a processor, said method comprising:

a step of generating allocation priorities for allocation of each of a plurality variables used in the source program to one of a plurality registers, at least one of register preference information indicating to which kind of register the each of the plurality variables should be allocated and variable relation information which indicating relationship between the each of the plurality variable and other variables in the source program, on basis of ways the each of the plurality variables is used in the source program;

a step of allocating the plurality variables to the plurality registers on basis of the allocation priorities;

a step of generating new variables dividing at least one of the plurality variables into at least two variables if determined that the at least one of the plurality variables cannot be allocated to a register different from registers to which said one or more other variables used simultaneously with the each of the plurality variables are allocated; and a step of selecting a simultaneously allocation candidate variable from simultaneously allocation candidate variables, one of allocation candidate variables having a maximum of difference between the highest allocation priority and the lowest allocation priority in the allocation priorities with respect to registers not assigned as simultaneously used variable, and assigns the selected simultaneously allocation candidate variable to a register that has the highest allocation priority.

25. A register allocation method of allocating a plurality of variables used in a source program to a plurality registers used in instructions for a processor, said method comprising:

a step of obtaining, with respect to each variable of the plurality variables, one or more other variables used simultaneously with the each variable of the plurality variables;

a step of generating a plurality of allocation sequences between the plurality variables to allocate the each variable of the plurality variables to one of the plurality registers different from registers to which said one or more other variables used simultaneously with the each variable of the plurality variables are allocated;

a step of obtaining allocation priorities indicating to which one of the plurality registers the each variable of the plurality variables is allocated with priority;

a step of allocating the plurality variables to the plurality registers in accordance with one of the allocation sequences selected on basis of the allocation priorities;

a step of generating new variables dividing at least one of the plurality variables into at least two variables if determined that the at least one of the plurality variables cannot be allocated to a registers different from the registers to which said one or more other variables used simultaneously with the each of the plurality variables are allocated; and a step of selecting a simultaneously allocation candidate variable from simultaneously allocation candidate variables, one of allocation candidate variables having a maximum of difference between the highest allocation priority and the lowest allocation priority in the allocation priorities with respect to registers not assigned as simultaneously used variable, and assigning the selected simultaneously allocation candidate variable to a register that has the highest allocation priority.

26. A register allocation method of converting a plurality variables used in a source program into registers used in instructions for a processor, said method comprising:

a step of generating allocation priorities for allocation of each of the plurality variables to one of a plurality registers, at least one of register preference information indicating to which kind of register the each of the plurality variables should be allocated and variable relation information which indicating a relationship between the each of the plurality variables and other variables in the source program, on basis of way in which the each of the plurality variables is used in the source program; and a step of allocating the plurality variables to the plurality registers on basis of the allocation priorities;

a step of generating new variables dividing at least one of the plurality variables into at least two variables if determined that the at least one of the plurality variables cannot be allocated to a register different from registers to which said one or more other variables used simultaneously with the each of the plurality variables are allocated; and a step of selecting a simultaneously allocation candidate variable from simultaneously allocation candidate variables, one of allocation candidate variables having a maximum of difference between the highest allocation priority and the lowest allocation priority in the allocation priorities with respect to registers not assigned as simultaneously used variable, and assigns the selected simultaneously allocation candidate variable to a register that has the highest allocation priority.

27. A computer program product comprising a computer storage device readable by computer readable by computer having computer readable program code means embodied therein for causing a register allocation apparatus, the computer readable program code means in said computer program product comprising computer readable program code means for causing a computer to effect the functions of claim 17.

28. An article of manufacture comprising a computer storage device readable by computer having computer readable program code means embodied therein for causing compilation, the computer readable program code means in said article of manufacture comprising computer readable program code means for causing a computer to effect the steps of claim 23.

29. An article of manufacture comprising a computer storage device readable by computer having computer readable program code means embodied therein for causing compilation, the computer readable program code means in said article of manufacture comprising computer readable program code means for causing a computer to effect the steps of claim 24.

30. An article of manufacture comprising a computer storage device readable by computer having computer readable program code means embodied therein for causing register allocation, the computer readable program code means in said article of manufacture comprising computer readable program code means for causing a computer to effect the steps of claim 25.

31. A program storage device readable by machine, tangibly embodying a program of instructions executable by the machine to perform method steps for compilation, said method steps comprising the steps of claim 24.

32. A program storage device readable by machine, tangibly embodying a program of instructions executable by the machine to perform method steps for register allocation, said method steps comprising the steps of claim 25.

* * * * *